(12) United States Patent
Yamakura et al.

(10) Patent No.: US 7,942,484 B2
(45) Date of Patent: May 17, 2011

(54) BRAKE SYSTEM FOR MOTORCYCLE

(75) Inventors: Yutaka Yamakura, Saitama (JP);
Sosuke Miki, Saitama (JP); Takero Shibukawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 814 days.

(21) Appl. No.: 11/902,905

(22) Filed: Sep. 26, 2007

(65) Prior Publication Data

US 2008/0079310 A1    Apr. 3, 2008

(30) Foreign Application Priority Data

Sep. 29, 2006  (JP) ................................. 2006-268419

(51) Int. Cl.
*B60T 8/32* (2006.01)
(52) U.S. Cl. ........................................ 303/137
(58) Field of Classification Search .............. 303/3, 137, 303/DIG. 10; 180/219, 272; 188/24.11
See application file for complete search history.

(56) References Cited

U.S. PATENT DOCUMENTS

| 7,661,502 B2 * | 2/2010 | Miki et al. ................... 180/219 |
| 2005/0134114 A1 * | 6/2005 | Asahi ............................ 303/137 |
| 2007/0188012 A1 * | 8/2007 | Hariu et al. ....................... 303/3 |

FOREIGN PATENT DOCUMENTS

| CN | 1448312 A | 10/2003 |
| JP | 5-105174 A | 4/1993 |
| JP | 2006-192980 A | 7/2006 |

* cited by examiner

*Primary Examiner* — Melanie Torres Williams
(74) *Attorney, Agent, or Firm* — Birch, Stewart, Kolasch & Birch LLP

(57) ABSTRACT

An ABS modulator for a front wheel is supported on the side surface of an inclined portion located forward of a portion, having the largest width, of the right main pipe with a unit supporting stay in between, while being arranged in a space inside the front cowl covering the front side of the inclined portion. The ABS modulator is arranged on the outer side of the main pipe. Accordingly, it is possible to avoid a case where the arrangement space for other components is occupied by arranging the ABS modulator in a space on the inner side of the right and left main pipes, and to support the ABS modulator by utilizing the main pipes having a high rigidity. Further, the resulting configuration allows to ABS modulator to be located in a portion having a high rigidity without occupying a space for other components, such as an induction system.

24 Claims, 13 Drawing Sheets

BRAKE SYSTEM FOR MOTORCYCLE

CROSS-REFERENCE TO RELATED APPLICATION

The present application claims priority under 35 U.S.C. §119 to Japanese Patent Application No. 2006-268419, filed Sep. 29, 2006, the entire contents of which are hereby incorporated by reference.

BACKGROUND OF THE INVENTION

1. Field of the Invention

The present invention relates to a brake system for motorcycle, and particularly to an advantageous arrangement structure of a hydraulic modulator.

2. Description of Background Art

In hydraulic brakes for front and rear wheels of a motorcycle, an ABS for avoiding the locking of a wheel is publicly known. It is known that a hydraulic modulator (an ABS modulator) as hydraulic adjustment means for the ABS is arranged in, for example, a portion forward of a head pipe as well as inside a front cowl, or a portion in a vicinity of a pivot shaft. See, for example, Japanese Patent Application Laid-open Publication No. Hei 5-105174.

What has to be considered when the hydraulic modulator is arranged in one of the above-described portions, which are relatively limited in size, is that these portions are generally used as space for arranging other components such as an induction system. The hydraulic modulator, which is a relatively large component, has to be arranged so as not to occupy the space where the other components are supposed to be disposed. For this reason, the layout becomes difficult. An object of the present application is to prevent the hydraulic modulator from occupying the arrangement space for other components and to provide a highly rigid supporting portion.

SUMMARY AND OBJECTS OF THE INVENTION

For the purpose of solving the above-described problem, a first aspect of the present invention is a brake system for motorcycle including a hydraulic brake, a hydraulic modulator, a pair of right and left body frames and a vehicle body cover. The hydraulic modulator prevents a wheel from locking, by adjusting a hydraulic pressure. The vehicle body cover covers the pair of right and left body frames. In the brake system for motorcycle, the hydraulic modulator is arranged, on the outer side of the pair of right and left body frames, as well as on the inner side of the vehicle body cover.

A second aspect of the present invention is the brake system for motorcycle which provides the following characteristics. In the brake system for motorcycle, the hydraulic modulator is one for a front wheel brake. In addition, the body frames are provided with a head pipe, and main pipes which extend rearward from the head pipe, and which are also inclined to open outward. Moreover, the hydraulic modulator is supported on a side face of the inclined portion of one of the main pipes. Furthermore, the vehicle body cover is a front cover which covers a portion surrounding the head pipe.

A third aspect of the present invention is the brake system for motorcycle which provides the following characteristics. In the brake system for motorcycle, the hydraulic modulator is one for a rear wheel brake. In addition, the body frames are seat rails which support a seat. Moreover, the vehicle body cover is a rear cowl which covers the vehicle body below the seat. Furthermore, the hydraulic modulator is arranged and housed in a portion, below the sheet, and inside the rear cowl, and the hydraulic modulator is also supported on the seat rail.

Effects of the Invention include the following:

According to the first aspect of the present invention, the hydraulic modulator is arranged, on the outer side of the pair of right and left body frames, as well as on the inner side of the vehicle body cover. For this reason, it is facilitated to arrange the hydraulic modulator in a relatively large space without occupying the arrangement space for other components such as an induction system. In addition, the hydraulic modulator is supported on the pair of right and left body frames which have a high rigidity. As a result, it is possible to reduce the weight of the supporting member.

According to the second aspect of the present invention, the hydraulic modulator is one for a front wheel brake. The body frames are provided with the head pipe, and the main pipes which extend rearward from the head pipe, and which are also inclined to open outward. The hydraulic modulator is supported on the side face of the inclined portion of one of the main pipes, and is arranged inside the front cover. As a result, it is possible to arrange the front-wheel hydraulic modulator by utilizing a relatively large space on the side of the inclined portion of the main pipe.

According to the third aspect of the present invention, the hydraulic modulator is arranged and housed in the portion, below the sheet, and inside the rear cowl, where a relatively large space is formed. As a result, the arrangement is facilitated, and also the hydraulic modulator can be supported by utilizing the seat rail having a high rigidity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
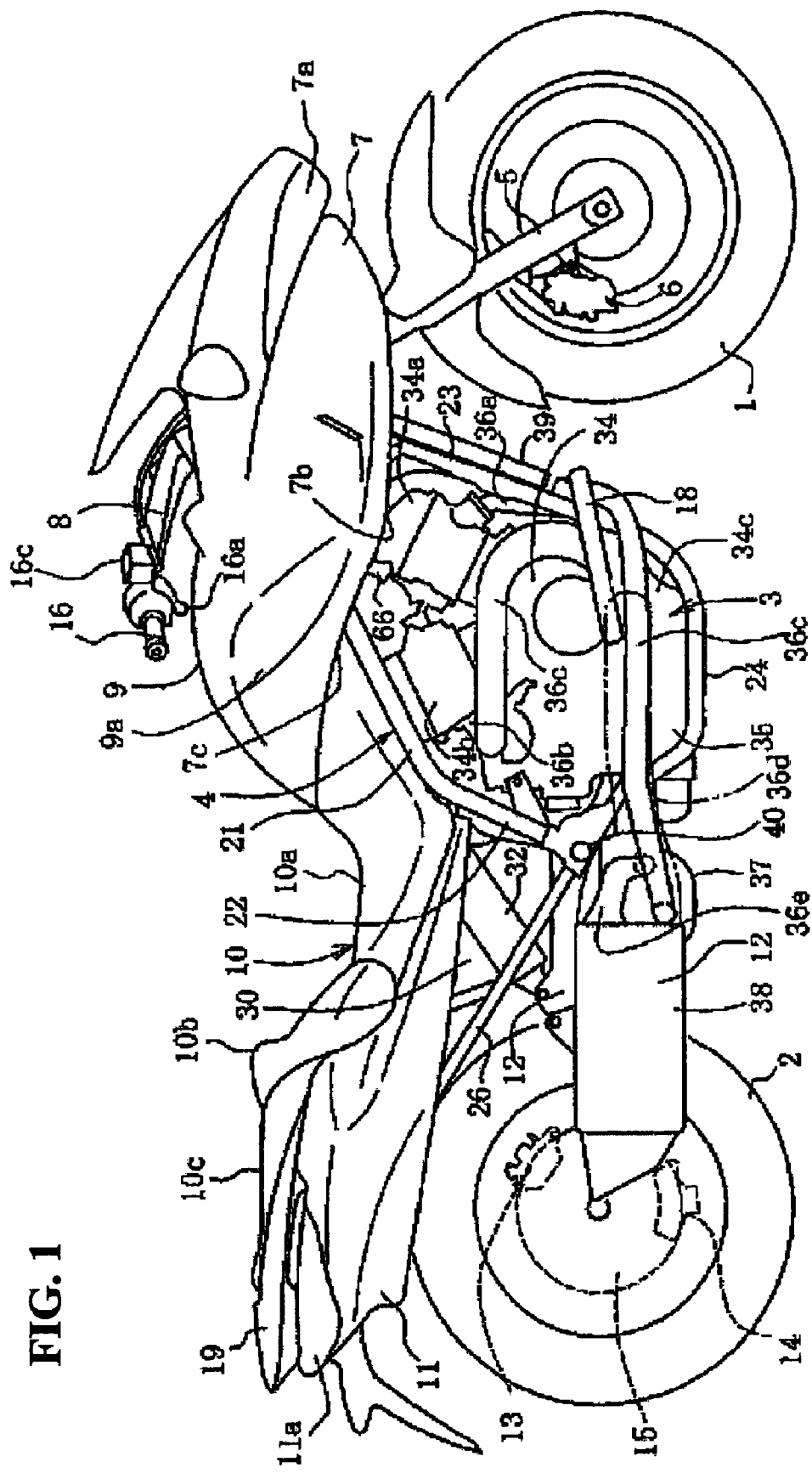
FIG. 1 is a right-side view showing a motorcycle according to a first embodiment.

FIG. 1 is a right-side view of a motorcycle according to the embodiment. A power unit 3 is arranged between a front wheel 1 and a rear wheel 2, and is supported by a vehicle body frame 4. FIG. 1 also shows a front fork 5, a front brake 6, a front cowl 7, a front lighting unit 7a, a handlebar 8, a tank cover 9, nce numerals 10, a seat 10, a front seat 10a, a backrest 10b, a rear seat 10c, a rear cowl 11 and a rear lighting unit 11a, a rear arm 12, a rear brake 13, a parking brake 14, a handlebar grip 16 (the right side is shown), a right-side lever 16a and a front master cylinder 16b. The operation of the lever 16a causes the front master cylinder 16c to activate the hydraulic front brake. Reference numeral 19 denotes a grab rail.

The grip 16 of the handlebar 8 is positioned above the top portion of the tank cover 9, and extends rearward to a large extent so as to reach a portion above a bank space formed between a front cylinder 34a and a rear cylinder 34b. An operating lever 66 of the parking brake is positioned below the grip 16. The operating lever 66 is positioned in front of, and in a vicinity of, the front end portion of the seat 10 in the side view. Concurrently, the operating lever 66 is exposed downward, facing a vicinity of a portion where a main pipe 21 intersects a lower end portion (hereinafter referred to as the lower side end portion) 7b of the side surface of the front cowl 7. A rear portion 7c of the lower side end portion 7b extends obliquely rearward and upward in the side view so as to overlap a front edge portion of the seat 10 positioned at the center of the vehicle body.

The portion where the main pipe 21 intersects the lower side end portion 7b of the front cowl 7 is the uppermost portion in the V-shaped space of the bank formed between the front cylinder 34a and the rear cylinder 34b. The operating lever 66 faces the V-shaped space. Concave portions 9a for knee grip are formed respectively in the side faces of the rear portion of the tank cover 9 so as to be held by the knees of the rider straddling the seat 10. Reference numeral 18 denotes a step, which is positioned near the lower portion of the side surface of a crankcase 34c. The front end portion of the step 18 intersects a down pipe 23 and protrudes forward of the down pipe 23, while the grip 16 is positioned above the rear end portion of the step 18.

Figure 2:
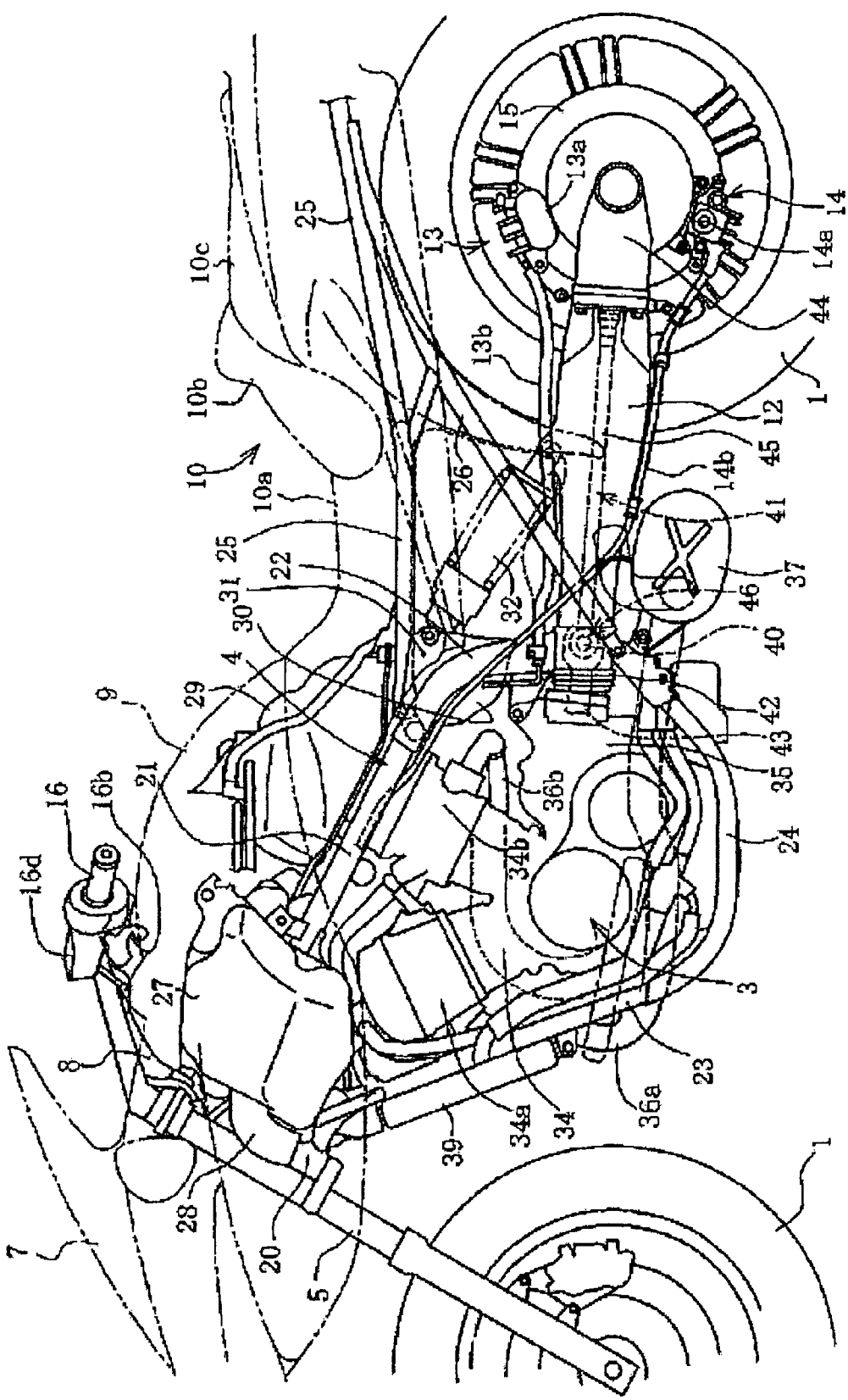
FIG. 2 is a side view showing a chief part of the left front portion of the vehicle body.

FIG. 2 is a side view showing a chief part of the front portion of the left side of the vehicle body. The vehicle body frame 4 includes a head pipe 20, the main pipe 21, a center pipe 22, the down pipe 23 and a lower pipe 24, and forms a loop in which these pipes are successively connected one to another. The head pipe 20 supports the front wheel 1 with the front fork 5 in between. The main pipe 21 extends from the head pipe 20 rearward above the power unit 3. The center pipe 22 is arranged rearward of the power unit 3, and extends in the up-and-down direction. The down pipe 23 extends from the head pipe 20 downward on the front side of the power unit 3, and the lower pipe 24 is arranged downward of the power unit 3, and extends in the front-and-rear direction. In this manner, the vehicle body frame 4 supports the power unit 3 in these pipes. A seat rail 25 extends rearward substantially in the horizontal direction from a vicinity of the portion where the main pipe 21 and the center pipe 22 are connected to each other. In addition, the vehicle body frame 4 is provided with a backstay 26 obliquely connecting the center pipe 22 and the seat rail 25.

The front fork 5 is rotatably supported by the head pipe 20. The front end portion of the main pipe 21 and the upper end portion of the down pipe 23 are joined to the head pipe 20, while an air cleaner 27 is supported, rearward of the head pipe 20, and in a vicinity of the front end portion of the main pipe 21. An air duct 28 extends forward from the front surface of the air cleaner 27, and is bent downward on the lateral side of the head pipe 20, so as to intake the outside air below. A first fuel tank 29 is supported, on the middle portion of the main pipe 21 in the front-and-rear direction, and on the front portion of the seat rail 25, rearward of the air cleaner 27.

A second fuel tank 30 is supported by the seat rail 25, rearward and downward of the first fuel tank 29. The second fuel tank 30 is housed in a space surrounded by the center pipe 22, the seat rail 25 and the backstay 26. The front portion of the second fuel tank 30 overlaps a part of the first fuel tank 29 in the upper-and-lower direction.

A stay 31 extending upward and rearward is provided to a shoulder portion of a vicinity of a portion where the upper portion of the center pipe 22 is bent forward so as to be connected to the main pipe 21. The upper portion of a cushion unit 32 constituting a rear suspension is supported by the stay 31. The stay 31 is arranged to the left side of the vehicle body. The cushion unit 32 extends obliquely downward and rearward on the left side of the vehicle body while the lower portion of the cushion unit 32 is supported on the middle portion of the rear arm 12.

The power unit 3 includes an engine 34 and a mission case 35. The engine 34 is a water-cooled 4-stroke V engine. The engine 34 is provided with the front cylinder 34a, the rear cylinder 34b and the crankcase 34c. Exhaust pipes 36a and 36b extending respectively from the front cylinder 34a and the rear cylinder 34b are joined into a collecting pipe 36c on the right side of the engine 34. The collecting pipe 36c extends from the right side of the vehicle body, and is connected to a first muffler 37 positioned in a vicinity of the rear side of the mission case 35 and below the rear arm 12. Reference numeral 36d denotes an exhaust pipe cover. The first muffler 37 is disposed to extend in the vehicle width direction. A rear-side exhaust pipe 36e extends rearward from the right side of the first muffler 37, and is connected to a second muffler 38 disposed to extend towards the right side of the rear arm 12 in the front-and-rear direction. A radiator 39 is supported on the down pipe 23, and cools down the engine 34. A pivot shaft 40 is provided at the middle portion of the center pipe 22 in the up-and-down direction.

The front end portion of the rear arm 12 is supported on the pivot shaft 40 provided at the middle portion of the center pipe 22 in the up-and-down direction so that the rear arm 12 swings in the up-and-down direction. The rear wheel 2 is supported on the right side of the rear end portion of the rear arm 12.

The drive type of the rear wheel 2 is a shaft drive type. The rotational output at an output shaft 43 of the power unit 3 is transmitted via a shaft drive mechanism 41 to a gear box 44 formed in the left side portion of the rear end portion of the rear arm 12, so as to rotationally drive the rear wheel 2.

A brake disk 15 is attached to the rear wheel 2 to rotate together with the rear wheel 2. The rear wheel 2 is braked with the brake disk 15 by a hydraulic brake caliper 13a of the rear brake 13 and a manual caliper 14a of the parking brake 14. The hydraulic brake caliper 13a is attached to the gear box 44, and is operated with hydraulic pressure sent through a brake hose 13b disposed along the upper surface of the rear arm 12.

The manual caliper 14*a* is also attached to the gear box 44, and is operated with a brake cable 14*b* disposed along the lower surface of the rear arm 12. The hydraulic brake caliper 13*a* and the manual caliper 14*a* are provided respectively to positions substantially symmetric to each other in the up-and-down direction on the brake disk 15.

The brake cable 14*b* passes over the center pipe 22 above the pivot shaft 40, extends forward along the lower surface of the main pipe 21, and is then connected to a parking lever (see FIG. 5) provided to the main pipe 21. So, the parking brake 14 is manually operated with the operation of the lever.

The brake hose 13*b* extends upward in a vicinity of the pivot shaft 40, thereafter extends forward along the lower surface of the main pipe 21 together with the brake cable 14*b*, and is then connected to a rear master cylinder 16*d* provided in a vicinity of the left-side grip 16 of the handlebar 8. So, hydraulic pressure is sent through the brake hose 13*b* to the rear brake 13 with the operation of the left-side lever 16*b* so that the caliper 13*a* is operated with the hydraulic pressure.

Figure 3:
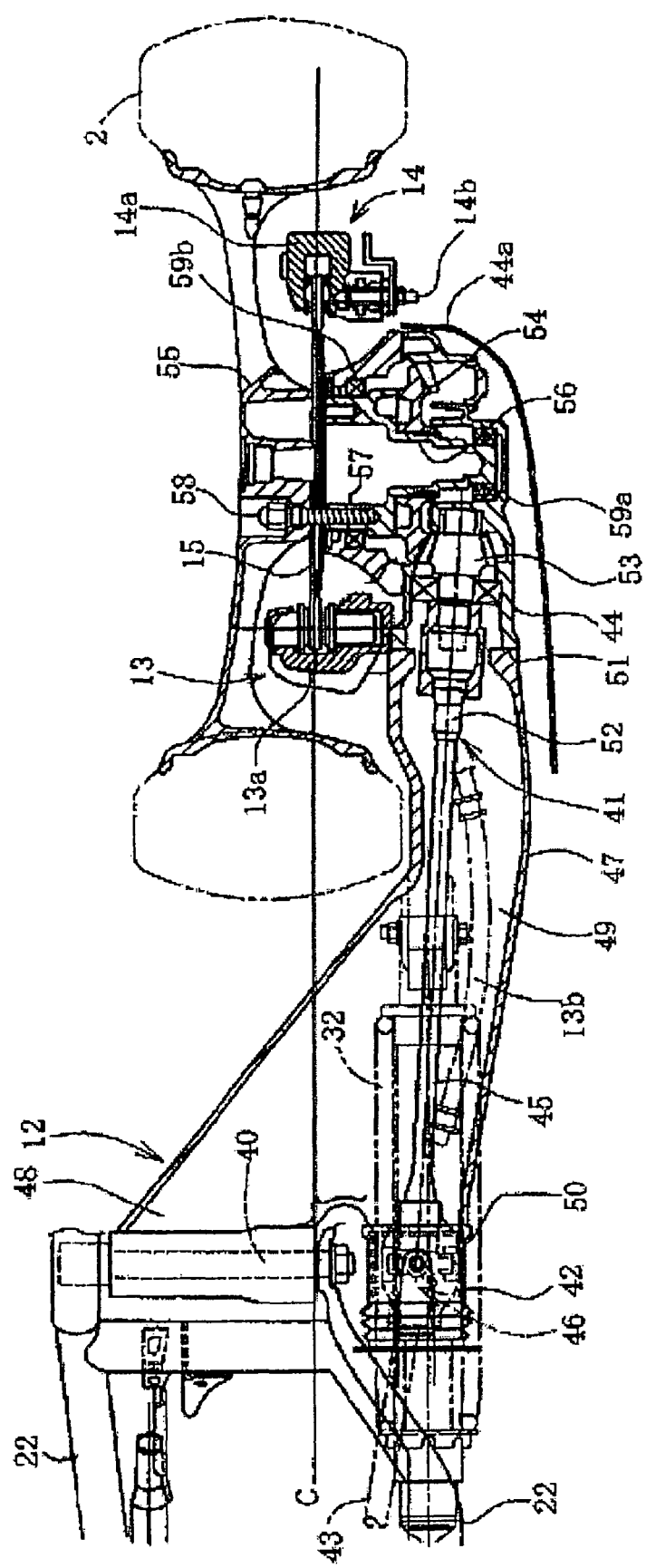
FIG. 3 is a horizontal cross-sectional view showing a rear arm.

FIG. 3 is a horizontal cross-sectional view of the rear arm 12. The output shaft 43 and a drive shaft 45 are joined to each other with a universal joint 46, which is covered with a joint boot 42.

An arm portion 47 and a cross portion 48 are integrally formed in the rear arm 12. The arm portion 47 extends in the front-and-rear direction on the left side of the vehicle body while the cross portion 48 expands in the vehicle width direction on the front portion of the arm portion 47, so that the entire rear arm 12 is formed into a hollow shape. The cross portion 48 is formed into a substantially triangle in the plan view in front of the rear wheel 2. The inside of the arm portion 47 forms a shaft path 49 penetrating therethrough in the front-and-rear direction. The drive shaft 45 is inserted in the front-and-rear direction through the shaft path 49. The rear end portion of the joint boot 42 is attached to a front-side opening portion 50 of the shaft path 49, and the front end portion of the drive shaft 45 is joined to the universal joint 46 housed in the joint boot 42.

A gear shaft 52, which is connected to the rear end of the drive shaft 45, projects into the gear box 44 from a rear-side opening portion 51 of the shaft path 49. A shaft-side beveled gear 53 attached to the rear end of the gear shaft 52 engages an axle-side beveled gear 54. The axle-side beveled gear 54 is connected to one end of a drive axle 56 penetrating a hub 55 of the rear wheel 2 in the vehicle width direction. The other end of the drive axle 56 is connected to, and combined with, the hub 55 with a bolt 57 and a nut 58.

The rotational driving power of the drive shaft 45 is transmitted from the shaft-side beveled gear 53 to the axle-side beveled gear 54 so as to rotate the drive axle 56, and further rotationally driving the rear wheel 2 combined with the drive axle 56 with the hub 55. The drive axle 56 is supported to the gear box 44 on bearings 59*a* and 59*b*. The brake disk 15 is held at the interstice between the drive axle 56 and the hub 55. The brake disk 15 is fastened together when the hub 55 is attached and bolted to the drive axle 56.

The hydraulic brake caliper 13*a* of the rear brake 13 moves a piston with hydraulic pressure supplied from the brake hose 13*b* so as to press a brake pad against the brake disk 15 to perform the braking. The manual caliper 14*a* of the parking brake 14 presses a brake pad against the brake disk 15 at the time when the brake cable 14*b* is pulled, so as to perform the braking. Since both of the brake caliper 13*a* and the manual caliper 14*a* are publicly known configurations, detailed descriptions will be omitted of those calipers.

Figure 4:
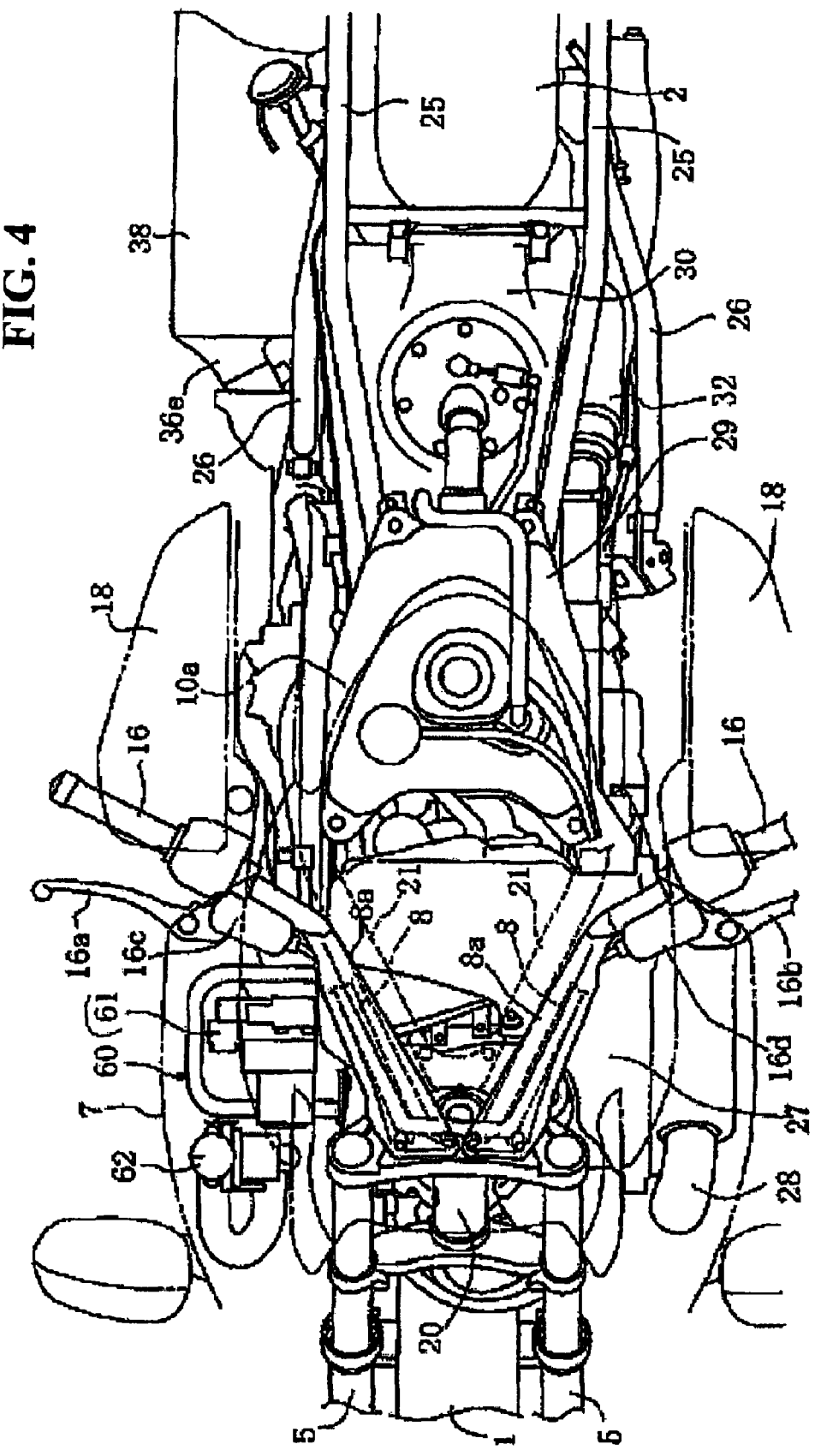
FIG. 4 is a plan view showing a chief part of the front portion of the vehicle body.

FIG. 4 is a plan view of a chief part of the front portion of the vehicle body. In FIG. 4, the front cowl 7 is indicated by an imaginary line, and also the illustration of the tank cover is omitted. The handlebar 8 is covered with a handlebar cover 8*a*, and extends rearward to a large extent on the right and left side so as to form a substantially V shape excluding the top portion. Each of the front fork 5, the main pipe 21, the seat rail 25 and the backstay 26 is provided on each of the right and left sides so as to be paired with each other. The air cleaner 27 is provided across the vehicle body in the vehicle width direction in front of the first fuel tank 29. A part of the front portion of the air cleaner 27 on the left side of the vehicle body projects forward so that a large capacity is secured.

A unit supporting stay 60 projecting outward with a substantially block U shape is provided in a vicinity of the grip 16 on the right side of the vehicle body. An ABS modulator 61 is supported on the unit supporting stay 60. The ABS modulator 61 is a publicly known hydraulic modulator which controls and reduces the hydraulic pressure of the front brake 6 so as to avoid the locking of the wheel.

A water filling cap 62 of the radiator 3 is disposed in front of the ABS modulator 61. The ABS modulator 61 and the water filling cap 62 are disposed and housed in the front cowl 7, outside the main pipe 21. This part is supported on the side surface of an inclined portion of the main pipe 21 located forward of a portion of the main pipe 21 with the largest width between the two main pipes 21 diverging from the head pipe 20 respectively to the right and left, while the front cowl 7 covering the front side of the inclined portion has a streamlined and curved surface. Accordingly, the front cowl 7 and the inclined portion form a relatively large space in between. For this reason, the ABS modulator 61 and the water filling cap 62 are easily housed in the space between the front cowl 7 and the inclined portion. Moreover, even in a case where the space is used as a housing space, disposing the ABS modulator 61 and the water filling cap 62 within the maximum width between the two main pipes 21 eliminates the necessity for enlarging the width of the vehicle body.

Figure 5:
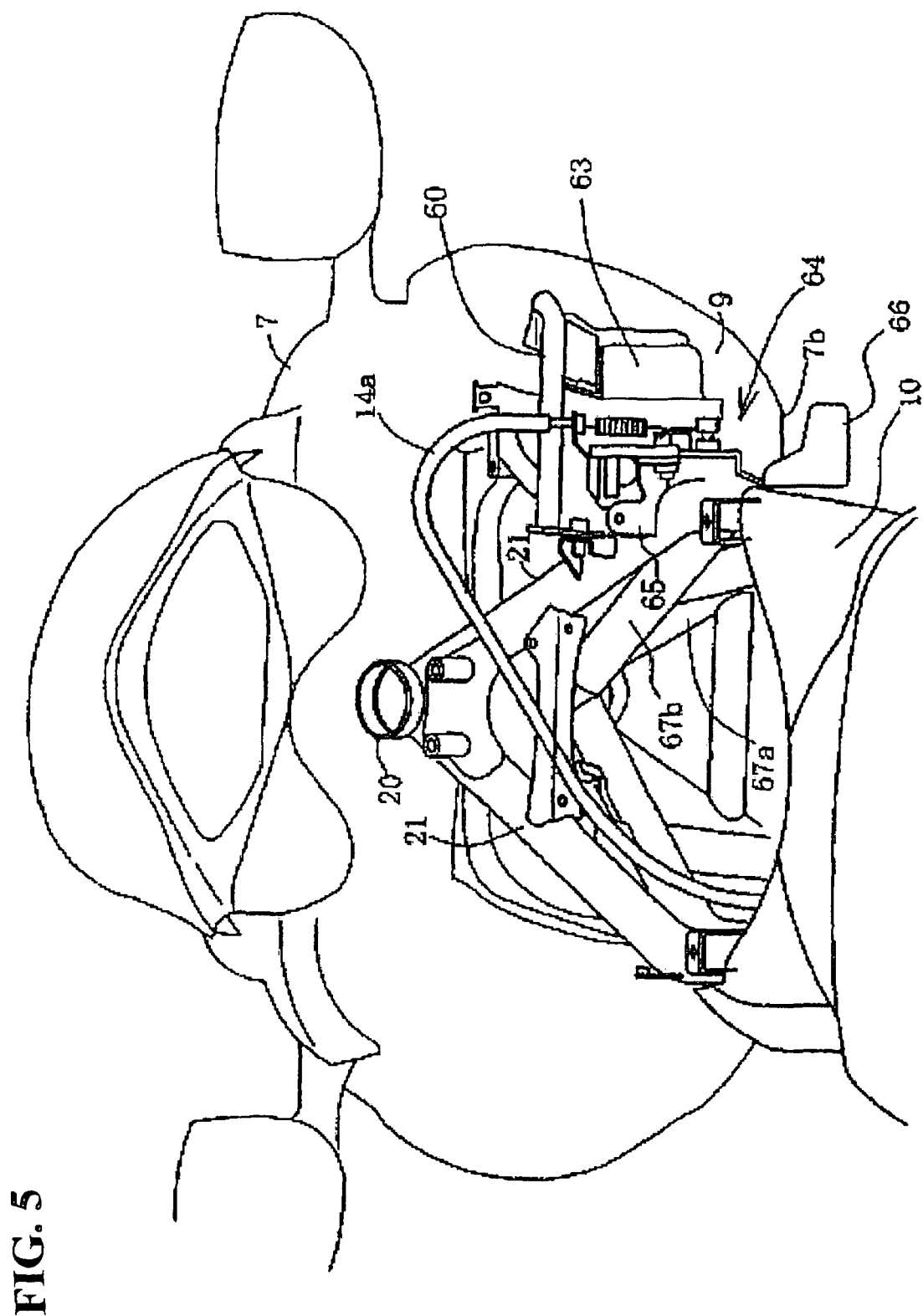
FIG. 5 is a perspective view showing a portion where an ABS modulator is supported.

FIG. 5 is a perspective view showing the portion where the ABS modulator 61 is supported as seen from behind the tank cover 9 in a state where the inside of the tank cover 9 is assumed to be transparent. The right and left main pipes 21 paired with each other diverge rearward from the head pipe 20. The unit supporting stay 60 projects rightward from the right side of the main pipes 21 to a space on the inner side of the front cowl 7. In addition, in the front cowl 7 positioned in front of the front end portion of the seat 10, a portion where the front cowl 7 continues to the tank cover 9, and where the air cleaner 27 is housed above the front cylinder 34*a* and in front of the first fuel tank 29 (see FIG. 4) is a portion with the largest width expanding in the vehicle width direction. The ABS modulator 61 and an operating mechanism 64 of the parking brake are disposed below a vicinity of the portion with the largest width.

A bracket 63 is provided to the unit supporting stay 60. The ABS modulator 61 (not shown) is supported on the bracket 63. In addition, the operating mechanism 64 of the parking brake is provided to the rear of the unit supporting stay 60. The bracket 63 includes a base plate 65 provided on the corresponding main pipe 21 and the operating lever 66. The front end of the brake cable 14*b* is connected to a plate (described later) rotated in response to the operation of the operating lever 66.

The operating mechanism 64 is provided on the right side of the vehicle body so that the operating lever 66 is operated by the rider with the right hand. The brake cable 14*b* extends upward from the operating mechanism 64 on the right side of the vehicle body, is then bent towards the left side of the vehicle body. The brake cable 14*b* further extends rearward along the main pipe 21 on the left side, and consequently extends to the parking brake 14, disposed on the left side of the vehicle body, of the rear wheel 2 (see FIGS. 2 and 3).

The side surface of the front cowl 7 is curved and projects outward. The unit supporting stay 60 is disposed in a space on the inner side of the outermost projecting portion of the side surface of the front cowl 7. The lower side end portion 7b of the front cowl 7 gets closer to the center of the vehicle body, as approaching the front end of the seat 10. Accordingly, the position of the lower side end portion 7b is narrowest at a portion where the lower side end portion 7b is connected to the front end of the seat 10. The operating lever 66 is exposed downward of the lower side end portion 7b at a portion, where the leg of the rider is unlikely to touch the operating lever 66, in front of the position where the width starts to be narrower, and concurrently in front of the position of the concave portion 9a (FIG. 1) for knee grip.

Figure 6:
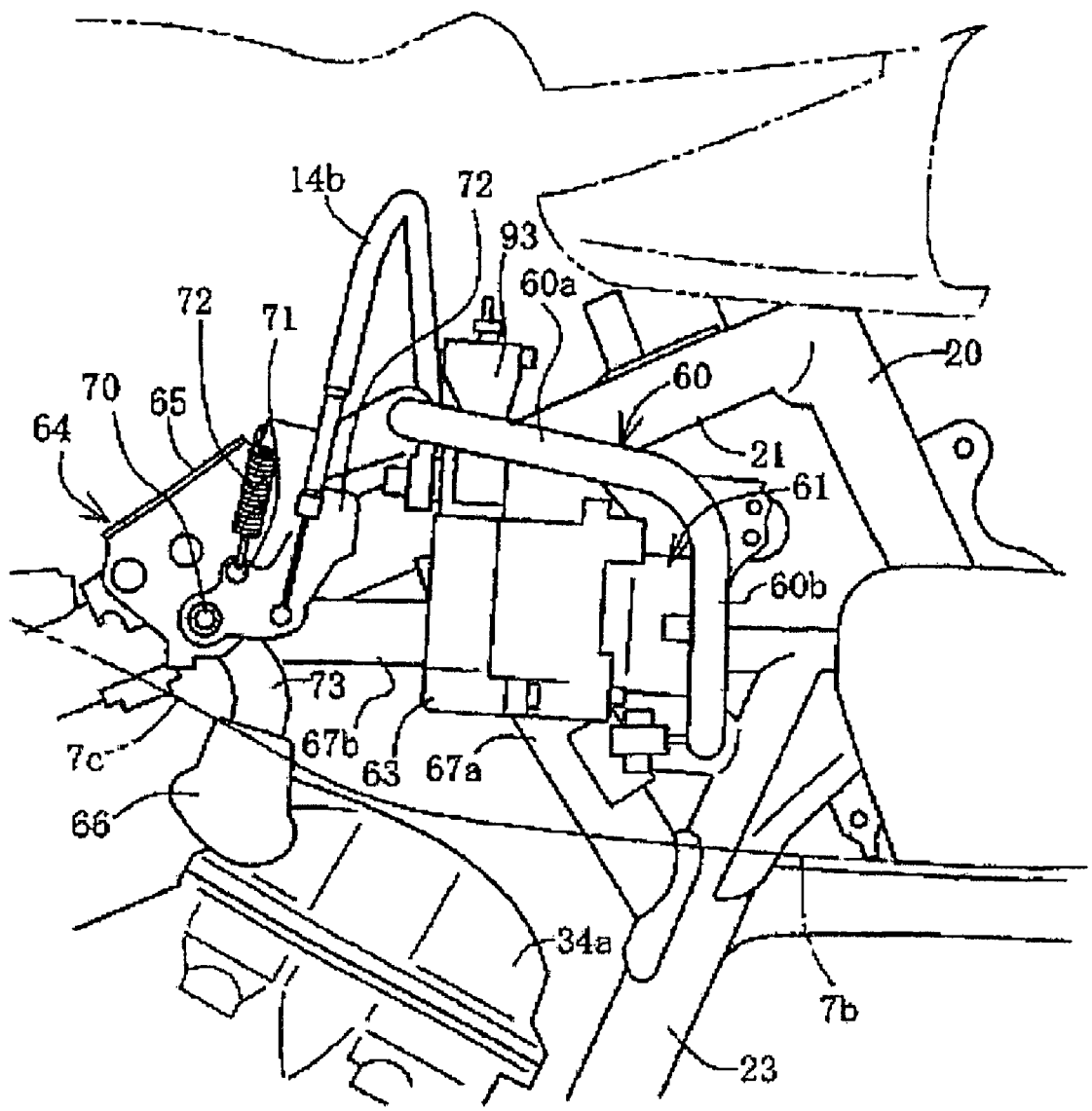
FIG. 6 is a side view showing the ABS modulator and an operating mechanism.

FIG. 6 is a side view showing a portion where the ABS modulator 61 and the operating mechanism 64. The ABS modulator 61 is positioned above the front cylinder 34a, while the operating mechanism 64 is positioned above and rearward of the top portion of the front cylinder 34a.

The bracket 63 having a substantially L-shape is supported below the unit supporting stay 60, and the ABS modulator 61 is supported on the bracket 63.

Figure 7:
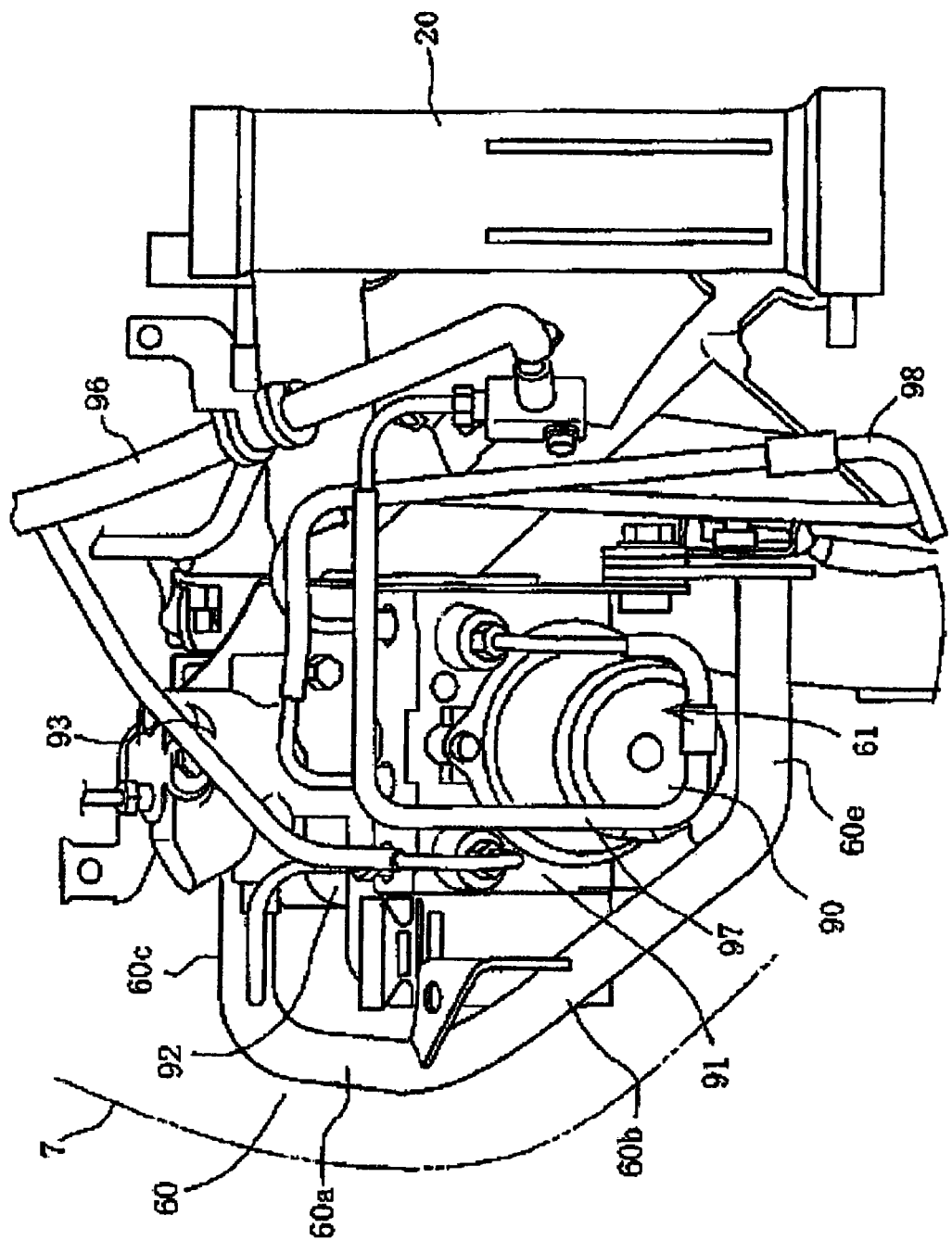
FIG. 7 is a diagram showing a state where the ABS modulator is attached.

FIG. 7 is a view from the front of the vehicle body, showing a state where the ABS modulator 61 is attached. The unit supporting stay 60 projects towards the side of the vehicle body inside the front cowl 7 while the lower portion of the unit supporting stay 60 is inclined obliquely outward and upward from the bottom. Accordingly, the lower portion of the unit supporting stay 60 protrudes to a small extent, so that the lower portion of the front cowl 7 is prevented from projecting outward to a large extent, thus preventing the bank angle from increasing. The ABS modulator 61 is surrounded by, and is positioned in, the unit supporting stay 60. The unit supporting stay 60 functions also as a guard member for the outer side portion of the ABS modulator 61. A brake hose 96 extends from the front master cylinder 16c. The brake hose 96 is connected to a pump 91 with a joint pipe 97 in between. A hose 98 connects the pump 91 with the front brake 6.

The ABS modulator 61 is positioned outward of the front portion of the vehicle body frame constituted of the head pipe 20, the main pipes 21, the down pipes 23, a reinforcement pipe 67a and the like. This configuration eliminates the need for laying out the ABS modulator 61 inside the front portion of the vehicle body frame, thus facilitating the layout. In addition, the ABS modulator 61 is not disposed in a space behind the head pipe 20, and on the inner side of the main pipes 21. This configuration also prevents the space for the arrangement of other components including the induction system disposed in this portion from being occupied.

Figure 8:
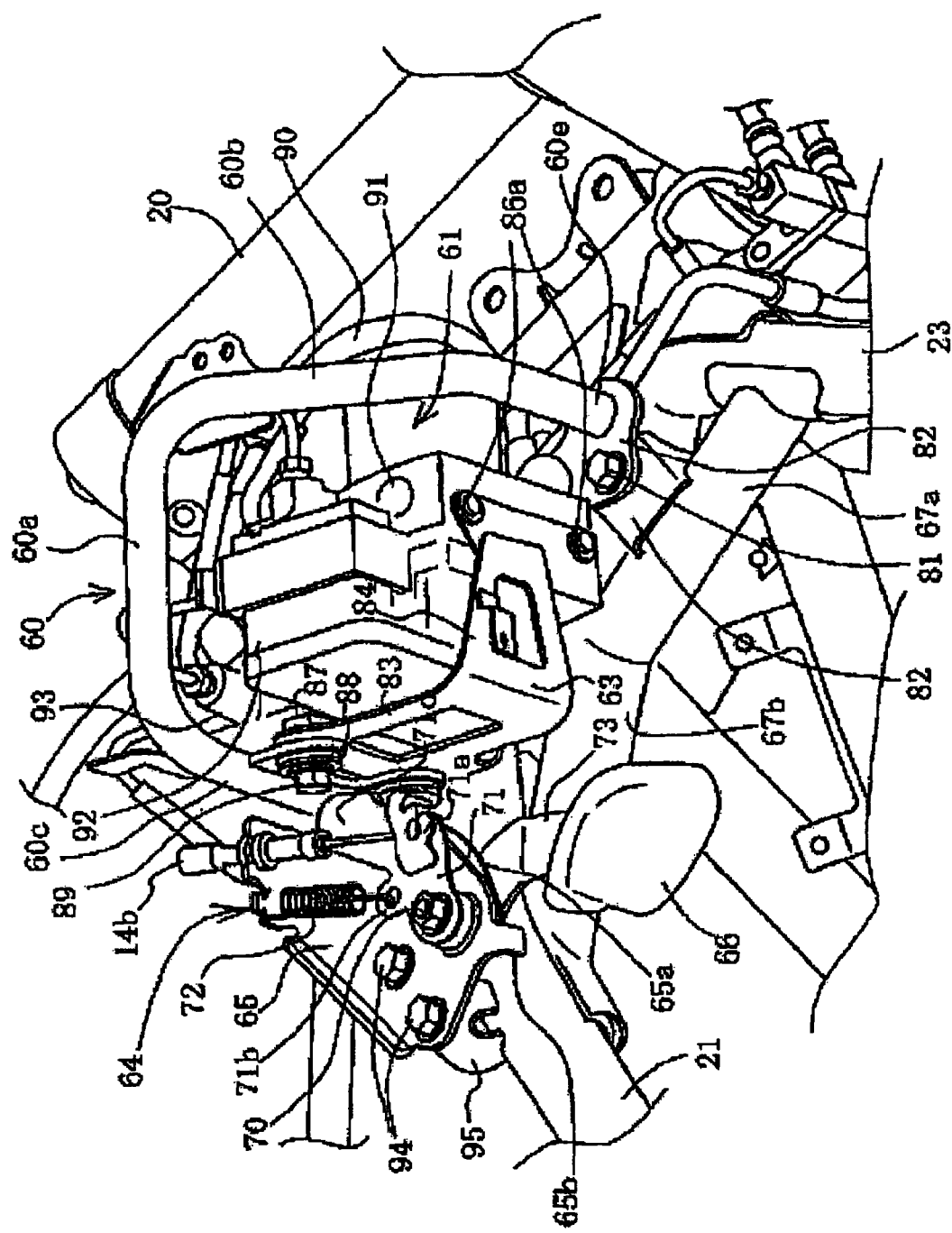
FIG. 8 is a perspective view showing the state where the ABS modulator is attached.

FIG. 8 is a perspective view from the rear and lower side, showing the state where the ABS modulator 61 is attached. The ABS modulator 61 is placed on the bracket 63. The bottom portion of the ABS modulator 61 is attached to the bracket 63 with a rubber mount 63a in between. The rear portion of the ABS modulator 61 is also attached thereto with a rubber mount as well. Accordingly, the entirety of the ABS modulator 61 is supported on the bracket 63 while vibrations of the ABS modulator 61 are suppressed. The ABS modulator 61 is a unit for controlling the hydraulic pressure, in which an electric motor 90, the pump 91 and a solenoid valve 92 are combined together. Reference numeral 93 denotes an actuator.

As described above, in the front cowl 7, the ABS modulator 61 and the operating mechanism 64 of the parking brake are disposed below the vicinity of the portion with the largest width continuing to the tank cover 9. Accordingly, there is no need for increasing the width of the front cowl 7 more than the width of the largest width for the purpose of disposing these components. This makes it possible to easily secure the arrangement space outside the vehicle body frame.

Figure 9:
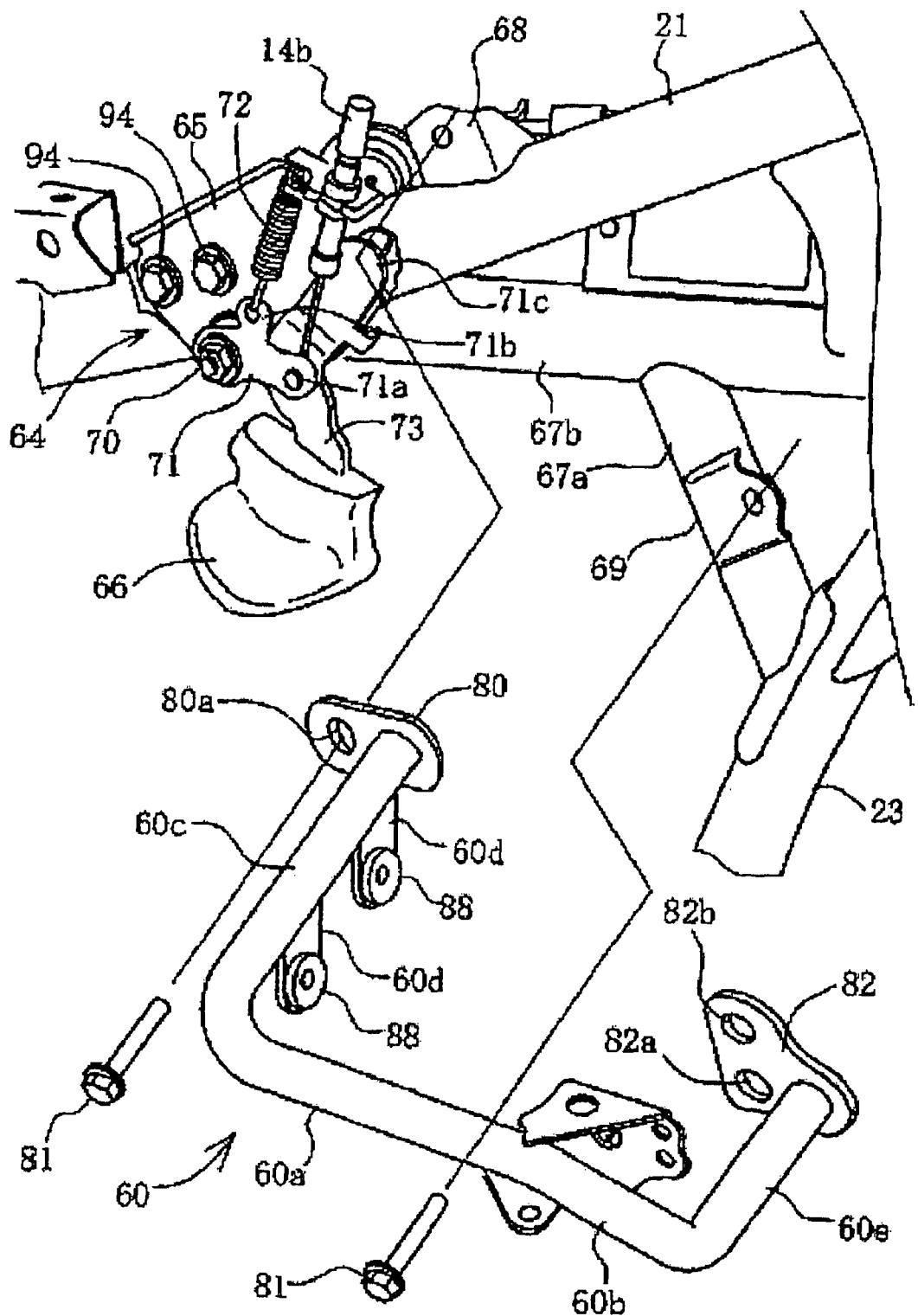
FIG. 9 is a diagram showing a state where the unit supporting stay is attached.

FIG. 9 shows a structure in which the unit supporting stay 60 is attached. The vehicle body frame where the unit supporting stay 60 is to be attached includes the reinforcement pipe 67a and a reinforcement pipe 67b. The reinforcement pipe 67b obliquely joins the lower portion of the head pipe 20, the front end portion of the down pipe 23 and the main pipe 21. The reinforcement pipe 67a obliquely joins the reinforcement pipe 67b and the down pipe 23. A stay 68 is welded to the main pipe 21 while a stay 69 is welded to the reinforcement pipe 67a. A weld nut (not shown) is formed on each of the stays 68 and 69.

The unit supporting stay 60 includes an upper portion 60a, a front portion 60b and a rear lateral portion 60c. The upper portion 60a extends, in the front-and-rear direction, substantially horizontally in the side view. The front portion 60b is bent, and extends below, from the front end of the upper portion 60a. The rear lateral portion 60c is bent inward at a right angle, and extends inward in a horizontal direction, from the rear end of the upper portion 60a. A stay 60d is formed on, and projects downward from, the rear lateral portion 60c. A front lateral portion 60e is provided to the front portion 60b. The front lateral portion 60e is bent at a right angle, and extends inward in parallel to the rear lateral portion 60c, from the lower end of the front portion 60b. These portions are formed continuously and integrally of one single pipe member.

A bracket 80 is provided to one end of the rear lateral portion 60c, and a through hole 80a is formed in one end of the bracket 80. A bolt 81 is inserted via the through hole 80a into the weld nut of the stay 68 welded on the main pipe 21, so that the rear lateral portion 60c is detachably attached to the stay 68. In the same manner, a bracket 82 with a through hole 82a is provided to one end of the front lateral portion 60e. A bolt 81 is inserted via the through hole 82a into the weld nut of the stay 69 welded on the reinforcement pipe 67a, so that the front lateral portion 60e is detachably attached to the stay 69. In addition, the bracket 82 is provided with another through hole 82b.

Figure 10:
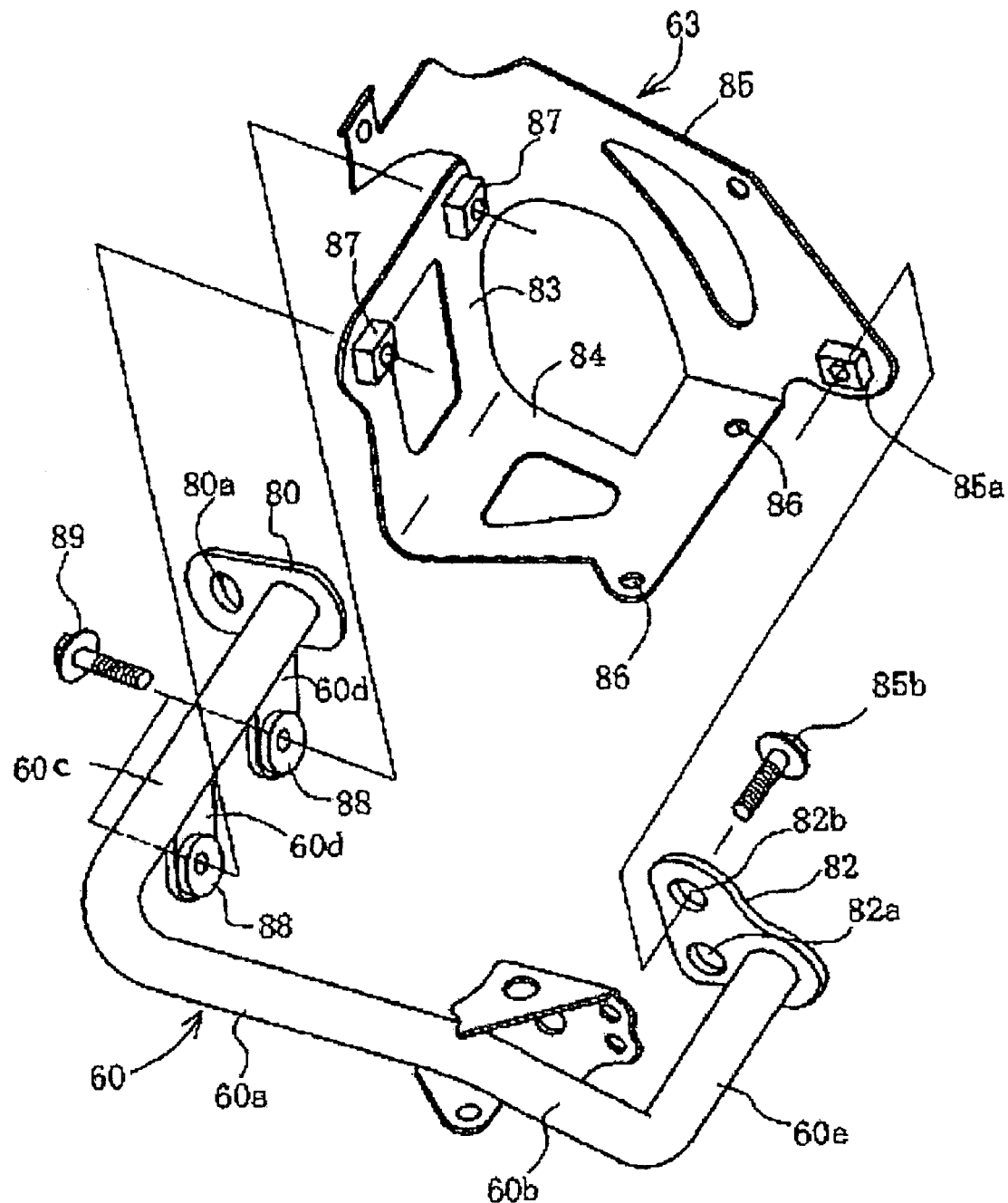
FIG. 10 is a diagram showing how the bracket is attached.

FIG. 10 is a view showing how the bracket 63 is attached. The bracket 63 is to be attached between the rear lateral portion 60c and the front lateral portion 60e. The bracket 63 is a press-molded component provided integrally with a rear wall 83, a bottom wall 84 and an inner-side wall 85. The rear wall 83 extends downward from the rear lateral portion 60c. The bottom wall 84 is bent, and extends forward, from the lower end of the rear wall 83. The inner-side wall 85 joins the inner-side end portion of the front edge of the bottom wall 84 and the inner-side end portion of the upper edge of the rear wall 83 to each other. A mount portion 86 is integrally formed on the outer side of the front edge of the bottom wall 84. The ABS modulator 61 is mounted on the mount portion 86 with the rubber mount (not shown). A weld nut 85a is attached to the front end portion of the inner-side wall 85. The weld nut 85a is placed to overlap the through hole 82b of the bracket 82, and is then fastened with a bolt 85b, so that the front end side of the bracket 63 is attached to the front lateral portion 60e.

Weld nuts 87 are provided to an upper portion of the rear wall 83. The upper portion of the rear wall 83 is placed on the stay 60d provided to the rear lateral portion 60c in a manner that the weld nuts 87 overlap rubbers 88 attached to the stay 60d. Bolts 89 are inserted respectively through the rubbers 88, and are fastened respectively to the weld nuts 87, so that the upper portion of the rear wall 83 is mounted on the stay 60d of the rear lateral portion 60c with the rubbers 88 in between.

As described above, the ABS modulator 61 is configured to be disposed in the space on the side of the inclined portion of the pair of right and left main pipes 21 extending and diverging from the head pipe 20. For this reason, it is possible to dispose the ABS modulator 61 in a relatively large space while preventing the space for the arrangement of other components including the induction system from being occupied. In particular, by disposing the ABS modulator 61 in a space in front of the concave portion 9a for knee grip of the tank cover 9, as well as in front of a position where the width of the front cowl 7 is the largest, it is possible to further facilitate the securing of the arrangement space. In addition, since the ABS modulator 61 is supported by using the pair of right and left main pipes 21 having a high rigidity, the weight of the supporting members is reduced. Moreover, since the ABS modulator 61 can be disposed to a position near the front brake 6, the total length of the pipes can be reduced as much as possible.

Next, descriptions will be given of the operating mechanism 64 of the parking brake with reference to FIGS. 8 to 10. The base plate 65 of the operating mechanism 64 is detachably attached to a stay 95 on the main pipe 21 with a bolt 94 (FIG. 8). The stay 95 is positioned in a vicinity of the stay 68 to which the unit supporting stay 60 is attached (FIG. 9). The operating mechanism 64 and the ABS modulator 61 are supported, close to each other in the front-and-rear direction, on the main pipe 21.

The operating mechanism 64 of the parking brake includes a pivotally-moving plate 71. One end of the pivotally-moving plate 71 is attached to the base plate 65 with an axle 70 so that the pivotally-moving plate 71 pivotally moves about the axle 70. The lower end of the brake cable 14b is joined to a locking portion 71a in the center of the pivotally-moving plate 71. A tension spring 72 is attached to a protruding portion 71b provided between the locking portion 71a and the axle 70, and connects the base plate 65 and the protruding portion 71b so as to bias the pivotally-moving plate 71 pivotally in the counterclockwise direction.

A projection 71d is provided to a tip portion 71c of the pivotally-moving plate 71. The projection 71d moves along an arc portion 65a of the base plate 65 in association with the rotational movement of the operating lever 66, and stops when abutting on a stopper (not shown) provided to one end of the arc portion 65a. In addition, a locking portion 65b protruding onto the rotational trace of the operating lever 66 is formed also in the other end of the arc portion 65a.

The axle 70 is joined to, and united with, a lever arm 73 extending from the operating lever 66 on the side opposite to the pivotally-moving plate 71 and the base plate 65. When the operating lever 66 is pulled rearward so as to rotationally move about the axle 70 in the clockwise direction, the pivotally-moving plate 71 is caused to rotationally move together with the operating lever 66 in the same direction against the elastic force of the tension spring 72. Accordingly, the pivotally-moving plate 71 pulls the brake cable 14b so as to activate the manual caliper 14a to perform the braking.

At this time, once the lever arm 73 rotationally moves over the locking portion 65b, the locking portion 65b restricts the returning movement of the lever arm 73 to the home position.

Pulling the operating lever 66 causes the lever arm 73 to disengage from the locking portion 65b. Then, once the operating lever 66 is released, the pivotally-moving plate 71 is caused to rotationally move in the counterclockwise direction by the elastic force of the tension spring 72 to loosen the brake cable 14b, so that the parking brake 14 is released. The operating lever 66 projects downward from the lower side end portion 7b of the front cowl 7 while the other components of the operating mechanism 64 is housed inside the front cowl 7 (see FIGS. 5 and 6). This locking arrangement allows the rotational movement of the operating lever 66 to be locked with a simple structure. It should be noted that the locking structure incorporates a publicly known structure, such as a ratchet mechanism, which allows the locking and releasing operations to be performed by the pulling of the operating lever 66.

In the above-described configuration of the operating mechanism 64 of the parking brake, the operating mechanism 64 of the parking brake is provided inside the front cowl 7 covering from the head pipe 20 to the vicinity of the seat 10, while the operating lever 66 is exposed in a manner of facing the lower side end portion 7b of the front cowl 7, at the position, in front of, and in the vicinity of, the front end portion of the seat 10 in the side view. This configuration allows the rider to operate the operating lever 66 without leaning forward to a large extent, so that the operability is improved. On the other hand, since the operating mechanism 64 is housed inside the front cowl 7, it is possible to avoid inadvertent operations. In particular, when the operating lever 66 is disposed, in front of the concave portion 9a for knee grip of the tank cover 9, and below the portion where the width of the front cowl 7 is the largest due to the placement of fuel tank, it is possible to easily avoid inadvertent operations.

Moreover, since the operating mechanism 64 is provided to the main pipe 21, it is possible to effectively utilize the main pipe 21 having a high rigidity. Moreover, since the operating lever 66 is attached to the right-side main pipe 21 disposed on the right side of the vehicle body, this configuration is advantageous to the right-hand operation.

Figure 11:
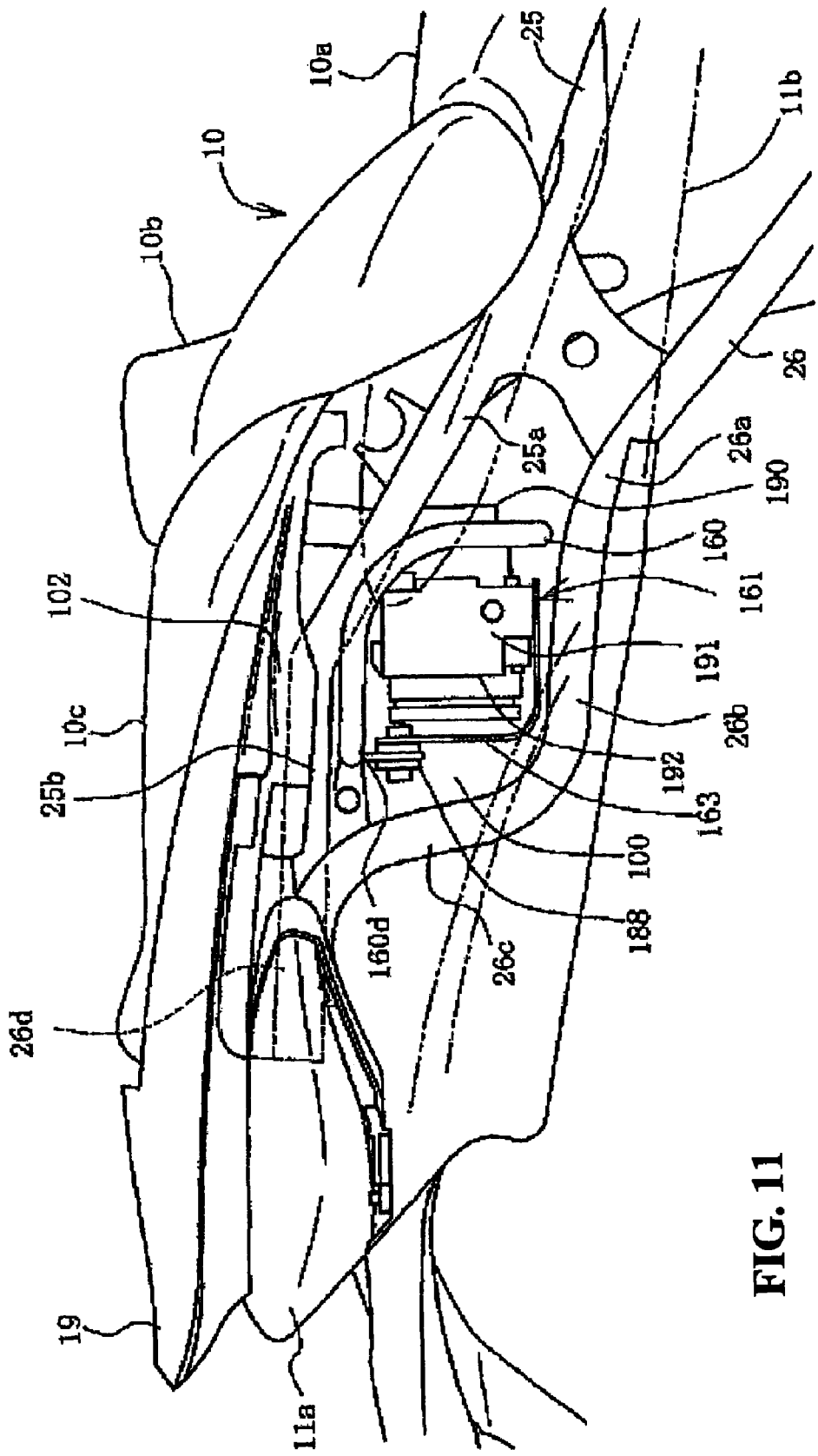
FIG. 11 is a diagram showing the inside of a rear cowl according to a second embodiment.
Figure 12:
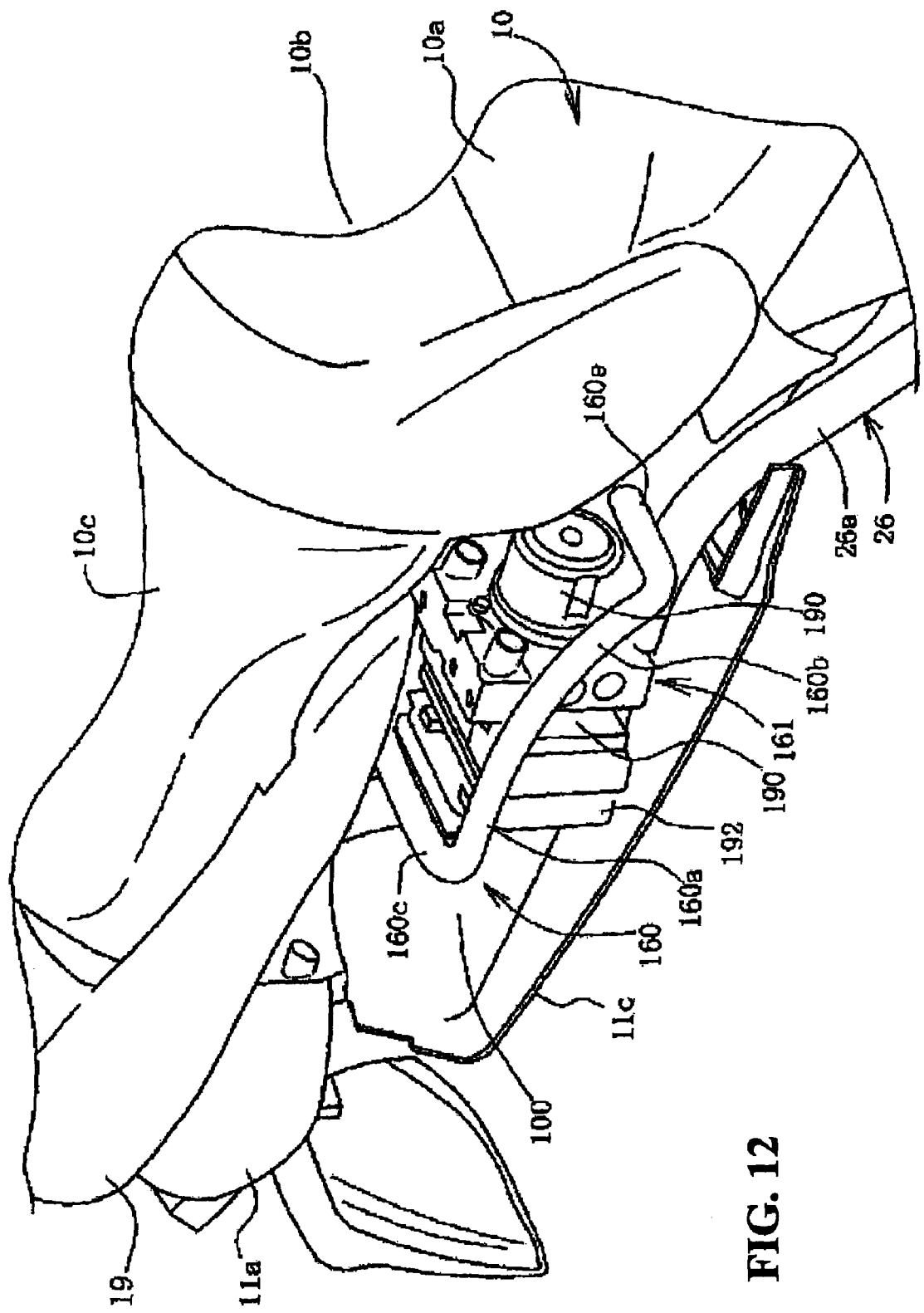
FIG. 12 is a perspective view showing a state where an ABS modulator according to the second embodiment is attached.
Figure 13:
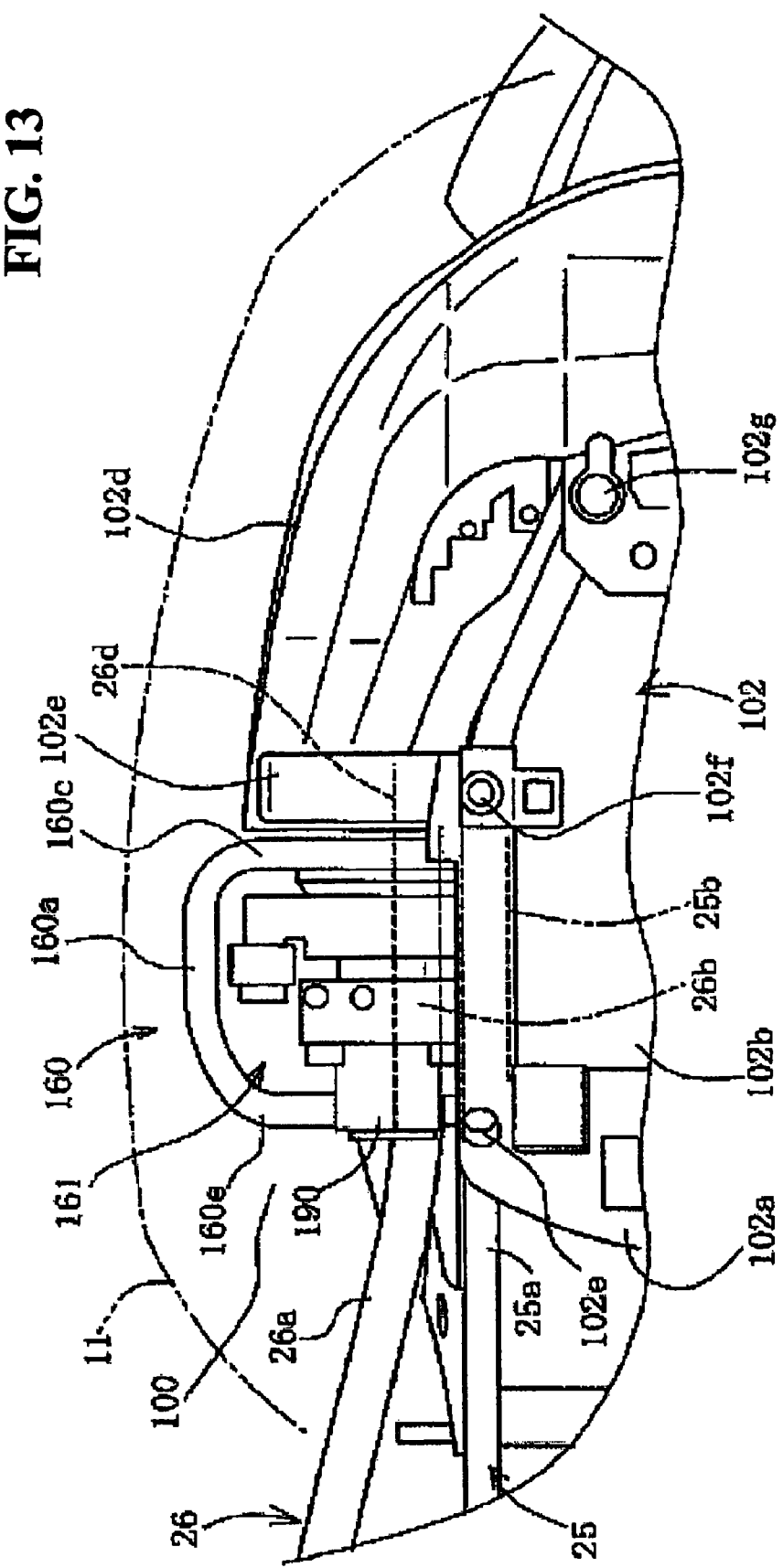
FIG. 13 is a plan view showing the right-side portion of the rear portion of a vehicle body according to the second embodiment.

FIGS. 11 to 13 show another embodiment in which the present invention is applied to an ABS for the rear brake. Since the vehicle, to which the ABS is attached, is the same as that shown in FIG. 1, the same components are provided respectively with the same reference numerals. FIG. 11 shows the inside of the rear cowl 11 in a state where a side panel 11b constituting the side portion of the rear cowl 11 is removed. The rear portion of the rear cowl 11 is configured in a manner where the rear lighting unit 11a is sandwiched by the grab rail 19 and the side panel 11b constituting the side portion of the rear cowl 11. An ABS modulator 161 for the rear brake is housed inside the rear cowl 11, that is, in front of the rear lighting unit 11a.

The seat rail 25 includes an inclined portion 25a and a horizontal portion 25. The inclined portion 25a extends obliquely upward and rearward below the back rest 10b, and the horizontal portion 25b is bent substantially horizontally below the rear seat 10c.

The backstay 26 also includes an inclined portion 26a, a horizontal portion 26b, an up-down portion 26c and a horizontal portion 26d, which continue in this order. The inclined portion 26a extends below, and is spaced apart from, the seat rail 25. The horizontal portion 26b extends rearward substantially along the front side portion of the lower end of the rear cowl 11. The up-down portion 26c is bent upward near substantially the middle portion of the rear cowl 11 in the front-and-rear direction, and then extends to the horizontal portion 26b. The horizontal portion 26d is bent rearward again in a manner that the horizontal portion 26d overlaps the up-down portion 26c. A space 100 is formed between the inclined portion 25a and the horizontal portion 25b, and the horizontal portion 26b. An ABS modulator 161 is disposed in the space 100.

A unit supporting stay 160, which has a substantially L-shape in the side view, is arranged from the horizontal portion 25b of the seat rail 25 to the horizontal portion 26b and the inclined portion 26a of the backstay 26, in the space 100. The unit supporting stay 160 and the ABS modulator 161 are similar respectively to the unit supporting stay 60 and the ABS modulator 61. The ABS modulator 161 controls the hydraulic pressure of the rear brake 13 so as to avoid the locking of the rear wheel. Although the pipe arrangement is not illustrated, the ABS modulator 161 is connected to the caliper of the rear brake, and is configured to reduce the hydraulic pressure appropriately at the right time to control the braking force.

A bracket 163 similar to the bracket 63 is attached to the unit supporting stay 160. The rear end portion of the bracket 163 is mounted with a rubber 188 on a stay 160d provided to the rear end portion of the unit supporting stay 160. Although not illustrated, the front end portion of the bracket 163 is attached to the backstay 26 in the similar manner to the foregoing embodiment. Reference numeral 102 denotes a cross plate attached on the inclined portion 25a and the horizontal portion 25b. The grab rail 19 is attached to the cross plate 102.

FIG. 12 is a perspective view showing a state where the attachment of the ABS modulator 161 is shown by removing the side panel 11b (see FIG. 11). A bottom portion 11c of the rear cowl 11 also functions as a rear fender, and has an arch-shaped cross section in which the center portion in the vehicle width direction is the highest. Although not illustrated, the side panel 11b is detachably attached to each side portion of the bottom portion 11c with tapping screws. The unit supporting stay 160 and the ABS modulator 161 are housed in a space between the grab rail 19 and the rear seat 10c, and the bottom portion 11c, in a manner that the unit supporting stay 160 and the ABS modulator 161 are partly protrude towards the side from the space. In addition, the unit supporting stay 160 and the ABS modulator 161 are disposed, not in the center portion of the bottom portion 11c functioning also as the rear fender, but in the lower position on the outermost side. Accordingly, the unit supporting stay 160 and the ABS modulator 161 are disposed in the uppermost portion on the side of the rear wheel 2. Moreover, the unit supporting stay 160 and the ABS modulator 161 are disposed in a vicinity of the backrest 10b of the rear cowl 11 where the width of the rear cowl 11 is the largest. This makes it easy to secure a space of a sufficient capacity for the disposition, on the side of each of the seat rail 25 and the backstay 26, and on the inner side of the rear cowl 11.

The unit supporting stay 160 includes an upper portion 160a, a front portion 160b, a rear lateral portion 160c and a front lateral portion 160e. The rear lateral portion 160c is provided with the stay 160d in the similar manner to the foregoing embodiment (FIG. 11). The ABS modulator 161 is housed inside the unit supporting stay 160, and includes an electric motor 190, a pump 191 and a solenoid valve 192.

FIG. 13 is a plan view of the right-side portion of the vehicle body, showing how the unit supporting stay 160 is attached. The unit supporting stay 160 has a substantially U-shape in the plan view, and is provided in a manner that the unit supporting stay 160 partly protrudes towards the side of the seat rail 25 and the backstay 26. The unit supporting stay 160 is also housed in a space on the inner side of the rear cowl 11. The ABS modulator 161 is surrounded by, and is positioned inside, the unit supporting stay 160. The horizontal portion 26b extends in the front-and-rear direction below the electric motor 190. The position where the ABS modulator 161 is disposed is also a position where the width of the rear cowl 11 is the largest.

In the portion where the unit supporting stay 160 is provided, the seat rail 25 and the backstay 26 are still spaced apart in the left-to-right direction from each other. The rear end portion of the horizontal portion 25b and the rear end portion of the horizontal portion 26d join and integrate with each other in a position on the rear of the unit supporting stay 160.

The cross plate 102 includes a front cross portion 102a, a straight portion 102b, a step portion 102c and a rear cross portion 102d. The front cross portion 102a bridges between the right and left seat rails 25. The straight portion 102b is placed over the horizontal portion 25b. The step portion 102c projects toward the side by substantially the same length as that of the rear lateral portion 160c, along the rear side of the rear lateral portion 160c. The rear cross portion 102d has a substantially U shape starting from the step portion 102c as the front end, and surrounding the rear ends of the respective horizontal portions 25b and 26b, and both sides of the horizontal portions 25b and 26b. The cross plate 102 is attached to the seat rail 25 at bosses 102e, 102f and 102g.

According to the above-described configuration, the ABS modulator 161 for the rear brake can be housed by effectively utilizing the internal space of the rear cowl 11. This makes it possible to facilitate the layout by utilizing the idle space. In addition, since the ABS modulator 161 is covered with the rear cowl 11, the ABS modulator 161 is invisible from the outside. Accordingly, the necessity of performing a process for improving the appearance exclusively for the ABS modulator 161 is eliminated while improving the appearance. Moreover, since the ABS modulator 161 is disposed in the vicinity of the backrest 10b, it is possible to dispose the ABS modulator 161 in the position where the width of the rear cowl 11 is the largest. Accordingly, the total length of the pipes is reduced, so that a simpler pipe arrangement with a smaller weight is achieved. Furthermore, since the ABS modulator 161 is disposed at a high position in the vehicle body, the air bleeding of the hydraulic system is facilitated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brake system for a motorcycle comprising:
   a hydraulic brake;
   a hydraulic modulator which prevents a wheel from locking, by adjusting a hydraulic pressure;
   a pair of right and left body frames extending along the lateral sides of the motorcycle; and
   a vehicle body cover which covers the pair of right and left body frames, wherein the hydraulic modulator is arranged laterally outside of the pair of right and left body frames, as well as on an inner side of the vehicle body cover.

2. The brake system for motorcycle according to claim 1, wherein
the hydraulic modulator is one for a front wheel brake,
the pair of right and left body frames are provided with a head pipe, and a pair of right and left main pipes which extend rearward from the head pipe, and which are also inclined to open outward,
the hydraulic modulator is laterally supported on a side face of the inclined portion of one of the main pipes, and
the vehicle body cover is a front cover which covers a portion surrounding the head pipe.

3. The brake system for a motorcycle according to claim 1, wherein
the hydraulic modulator is one for a rear wheel brake,
the pair of right and left body frames are a pair of right and left seat rails which support a seat,
the vehicle body cover is a rear cowl which covers the vehicle body below the seat, and
the hydraulic modulator is arranged and housed in a portion, below the seat, and inside the rear cowl, and the hydraulic modulator is also supported on the seat rail.

4. The brake system for motorcycle according to claim 1, wherein the hydraulic modulator is supported on a unit supporting stay which projects laterally from a right side of the right body frame.

5. The brake system for motorcycle according to claim 1, further comprising:
a unit supporting stay which projects laterally from a right side of the right body frame; and
a bracket provided to the unit supporting stay, wherein the hydraulic modulator is supported on the bracket.

6. The brake system for motorcycle according to claim 1, wherein the hydraulic modulator is disposed behind a water filling cap of a radiator.

7. The brake system for motorcycle according to claim 1, further comprising:
a unit supporting stay which projects laterally from a right side of the right body frame, wherein the hydraulic modulator is surrounded by, and is positioned in, the unit supporting stay.

8. The brake system for motorcycle according to claim 5, wherein the bracket includes a rear wall, a bottom wall, and an inner-side wall, the bracket being attached between a rear lateral portion and a front lateral portion of the unit supporting stay.

9. The brake system for motorcycle according to claim 3, wherein the hydraulic modulator is supported on a unit supporting stay which projects from a horizontal portion of the seat rail.

10. The brake system for motorcycle according to claim 3, further comprising:
a unit supporting stay which projects from a horizontal portion of the seat rail; and
a substantially L-shaped bracket provided to the unit supporting stay, wherein the hydraulic modulator is supported on the substantially L-shaped bracket.

11. A brake system for a motorcycle comprising:
a hydraulic brake;
a hydraulic modulator which prevents a wheel from locking, by adjusting a hydraulic pressure;
a pair of right and left body frames extending along the lateral sides of the motorcycle; and
a vehicle body cover which covers the pair of right and left body frames, wherein the hydraulic modulator is arranged laterally outside of the pair of right and left body frames and a head pipe, as well as on an inner side of the vehicle body cover.

12. The brake system for motorcycle according to claim 11, wherein
the hydraulic modulator is one for a front wheel brake,
the pair of right and left body frames are provided with the head pipe, and a pair of right and left main pipes which extend rearward from the head pipe, and which are also inclined to open outward,
the hydraulic modulator is laterally supported on a side face of the inclined portion of one of the main pipes, and
the vehicle body cover is a front cover which covers a portion surrounding the head pipe.

13. The brake system for a motorcycle according to claim 11, wherein
the hydraulic modulator is one for a rear wheel brake,
the pair of right and left body frames are a pair of right and left seat rails which support a seat,
the vehicle body cover is a rear cowl which covers the vehicle body below the seat, and
the hydraulic modulator is arranged and housed in a portion, below the seat, and inside the rear cowl, and the hydraulic modulator is also supported on the seat rail.

14. The brake system for motorcycle according to claim 11, wherein the hydraulic modulator is supported on a unit supporting stay which projects laterally from a right side of the right body frame.

15. The brake system for motorcycle according to claim 11, further comprising:
a unit supporting stay which projects laterally from a right side of the right body frame; and
a bracket provided to the unit supporting stay, wherein the hydraulic modulator is supported on the bracket.

16. The brake system for motorcycle according to claim 11, wherein the hydraulic modulator is disposed behind a water filling cap of a radiator.

17. The brake system for motorcycle according to claim 11, further comprising:
a unit supporting stay which projects laterally from a right side of the right body frame, wherein the hydraulic modulator is surrounded by, and is positioned in, the unit supporting stay.

18. The brake system for motorcycle according to claim 15, wherein the bracket includes a rear wall, a bottom wall, and an inner-side wall, the bracket being attached between a rear lateral portion and a front lateral portion of the unit supporting stay.

19. The brake system for motorcycle according to claim 13, wherein the hydraulic modulator is supported on a unit supporting stay which projects from a horizontal portion of the seat rail.

20. The brake system for motorcycle according to claim 13, further comprising:
- a unit supporting stay which projects from a horizontal portion of the seat rail; and
- a substantially L-shaped bracket provided to the unit supporting stay, wherein the hydraulic modulator is supported on the substantially L-shaped bracket.

21. A brake system for a motorcycle comprising:
- a front wheel brake;
- a hydraulic modulator which prevents a wheel from locking by adjusting a hydraulic pressure, said hydraulic modulator being operatively associated with and in close proximity to the front wheel brakes; and
- a body frame, including right and left main pipes which extend rearward from the front toward the rear of the motorcycle and along the lateral sides of the motorcycle, wherein the hydraulic modulator is arranged laterally outside of one of the main pipes.

22. The brake system of claim 21, further including a rear wheel brake and hydraulic modulator, said body frame including right and left seat rails which support a seat, wherein the hydraulic modulator is supported by the seat rails.

23. The brake system of claim 22 wherein the vehicle body cover includes a front cowl which covers the hydraulic modulator.

24. The brake system of claim 23, wherein the vehicle body cover includes a rear cowl which covers the hydraulic modulator below the seat.

* * * * *